United States Patent [19]

Canarutto

[11] 3,723,867
[45] Mar. 27, 1973

[54] APPARATUS HAVING A PLURALITY OF MULTI-POSITION SWITCHES FOR AUTOMATICALLY TESTING ELECTRONIC CIRCUIT BOARDS

[75] Inventor: Claudio Canarutto, 10099 San Mauro Torinese, Italy

[73] Assignee: Ing. C. Olivetti & C., S.p.A., Ivreas (Turin), Italy

[22] Filed: Aug. 7, 1970

[21] Appl. No.: 62,079

[30] Foreign Application Priority Data

Aug. 7, 1969 Italy...............................52924 A/69

[52] U.S. Cl. ...............324/73 PC, 324/51, 324/158 F
[51] Int. Cl. ..........................G01r 15/12, G01r 31/02
[58] Field of Search .......................324/73, 51, 158 F

[56] References Cited

UNITED STATES PATENTS

| | | | |
|---|---|---|---|
| 3,219,927 | 11/1965 | Topp et al. | 324/73 R |
| 3,430,135 | 2/1969 | Mullen | 324/54 X |
| 3,541,440 | 11/1970 | Silverman | 324/73 |
| 2,887,622 | 5/1959 | Rayburn et al. | 324/73 FC X |
| 2,918,648 | 12/1959 | Ludman et al. | 324/73 PC UX |
| 3,235,797 | 2/1966 | Boscia et al. | 324/73 |
| 3,506,814 | 4/1970 | MacDonald et al. | 324/73 X |
| 3,564,408 | 2/1971 | Schulz et al. | 324/158 F |

Primary Examiner—Gerard R. Strecker
Attorney—Birch, Swindler, McKie & Beckett

[57] ABSTRACT

An apparatus for automatically testing electronic printed circuit boards is provided with a plate having a plurality of resiliently biased contacts disposed in the same configuration as the connecting positions of the board to be tested. Under manual control, the circuit board is moved toward the plate to bring the contacts against the corresponding connecting positions. Each of the contacts is associated with a common terminal of a multi-position switch having a plurality of selectable terminals. One of the selectable terminals of each multi-position switch is connected to a computer for selectively sensing the electrical conditions of the terminal. The other selectable terminals are connected to a plurality of means for generating input conditions, and the computer includes means for selectively connecting the contacts to one of the input condition generating means in a manner to isolate each of the circuits functionally in succession in order to test them individually. The computer further includes memory devices to store the test program and data sets relating to the testing of a number of different types of circuit boards. The data set for a particular type of circuit board is manually selected by means of a keyboard, and the results of the test are automatically printed.

2 Claims, 4 Drawing Figures

Patented March 27, 1973

INVENTOR.
CLAUDIO CANARUTTO

INVENTOR.
CLAUDIO CANARUTTO

3,723,867

APPARATUS HAVING A PLURALITY OF MULTI-POSITION SWITCHES FOR AUTOMATICALLY TESTING ELECTRONIC CIRCUIT BOARDS

CROSS-REFERENCE TO RELATED APPLICATIONS

The present application corresponds to Italian Pat. Application No. 52924-A/69 filed on Aug. 7, 1969, for which priority is claimed.

BACKGROUND OF THE INVENTION

1. Field of the Invention

The present invention relates to an apparatus for automatically testing electronic circuit boards provided with a plurality of connecting positions disposed in a predetermined configuration and for connecting a plurality of electronic circuits of a number of predetermined types.

2. Description of the Prior Art

The testing of an electronic circuit or apparatus differs from the testing of a mechanical apparatus in that the causes of incorrect operation are less obvious. Manual electronic testing therefore requires the use of very complex and very costly instrumentation which can be used only by a skilled operator. Moreover, these operators must be trained for a long time to deal with any new apparatus to be tested.

The introduction of automatic testing substantially eliminates these drawbacks, presenting the repairer with a panoramic and detailed view of all the elements of the circuit which are not functioning correctly and dispensing with the necessity for the tester to be acquainted with the operation of the circuit being examined. Testers may therefore be persons with ordinary qualifications. In addition, the time required for conversion from one kind of production to another is considerably reduced.

The automatic testing of electronic circuit boards has heretofore been effected by connecting the external contacts of the board to a computer which is suitably programmed and able to detect correct or faulty operation of the board. Testing of this kind, however, only confirms whether the board is functioning correctly or not, without identifying the cause of trouble or breakdown and without locating this cause topologically on the board itself. This kind of testing is therefore only partly automatic, since it requires subsequent manual examination, even if limited, to identify the damaged element.

There is known an arrangement for automatically testing boards used simply as connections for electronic circuits. In this case, the testing is carried out to ascertain that there are no short-circuits or broken circuits. A suitably programmed computer sends signals successively to the various connectors and measuring instruments check whether these signals reach the desired points. The testing of these connecting boards is thus completely automated, but this is not complicated by the presence of a multiplicity of elements functioning in accordance with various different logical combinations and therefore achieves an aim different to that which the present invention proposes to achieve.

SUMMARY OF THE INVENTION

The technical problem that the present invention proposes to solve is that of producing an apparatus for automatically testing boards supporting electronic circuits which will detect or identify any individual damaged elements and give indications of the position of these elements on the board.

This technical problem is solved by the automatic testing apparatus according to the invention, which is characterized by a plate having a plurality of resiliently biased contacts disposed in the same configuration as the connecting positions of the board to be tested, manually controlled means being provided for bringing said contacts against the corresponding connecting positions, each of said contacts being associated with a common terminal of a multi-position switch having a plurality of selectable terminals, one of the selectable terminals of each of said switches may be connected to a computer or any other suitable means for sensing selectively the electrical conditions obtaining at said terminal, the other selectable terminals of each of said switches being connected to a plurality of means for generating input conditions, are provided, e.g., in the computer means for selectively connecting said contacts to one of said means for generating input conditions so as to isolate each of said circuits functionally in succession in order to test them individually, an interchangeable insulating mask being disposed over said plate for selectively insulating said contacts from the corresponding connecting positions on the board to be tested.

BRIEF DESCRIPTION OF THE DRAWINGS

The following description of a preferred embodiment of the testing apparatus according to the invention is given by way of non-limitative example with the aid of the accompanying drawings, in which.

DESCRIPTION OF THE PREFERRED EMBODIMENT

Figure 1:
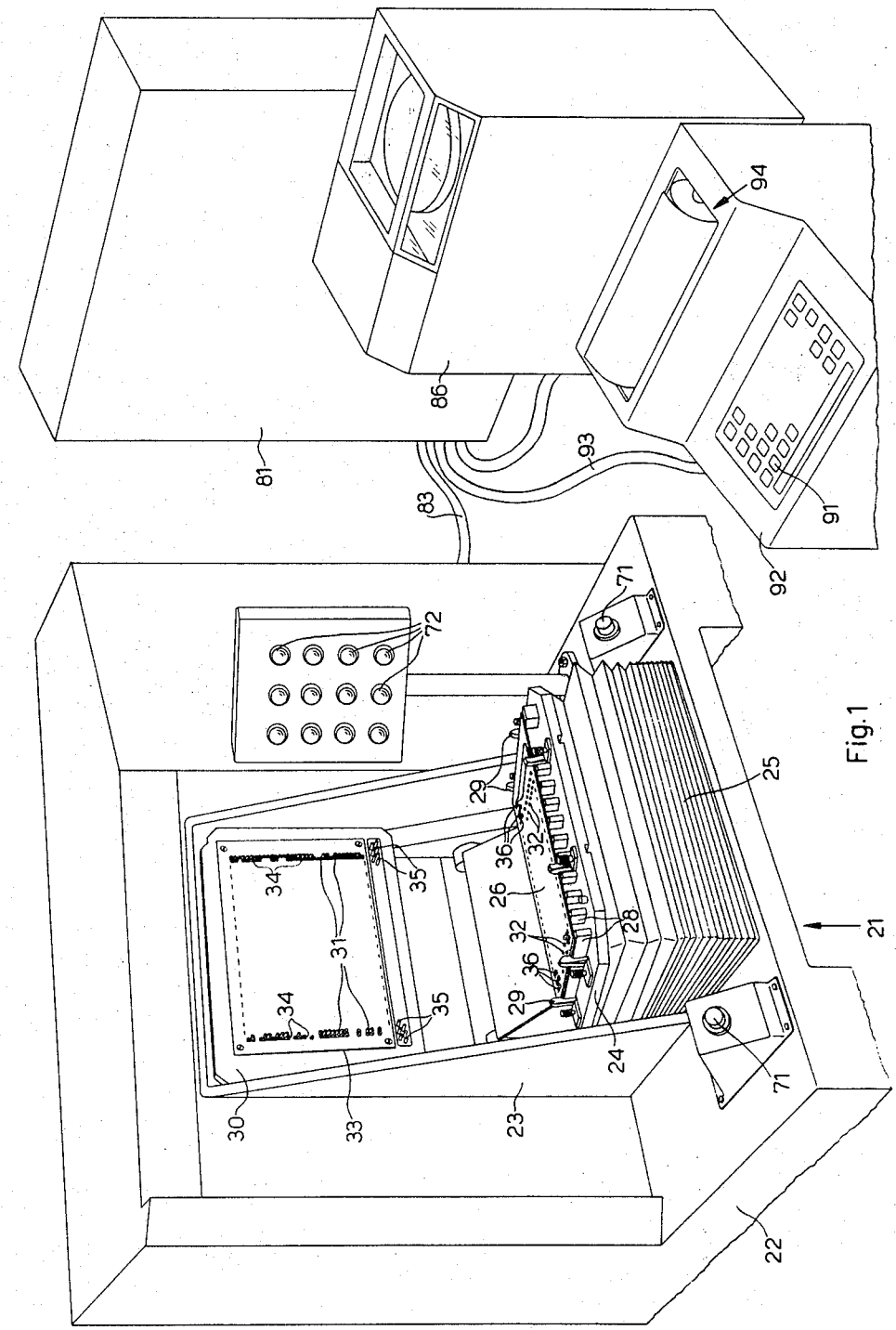
FIG. 1 is a general perspective view of the testing apparatus according to the invention.
Figure 3:
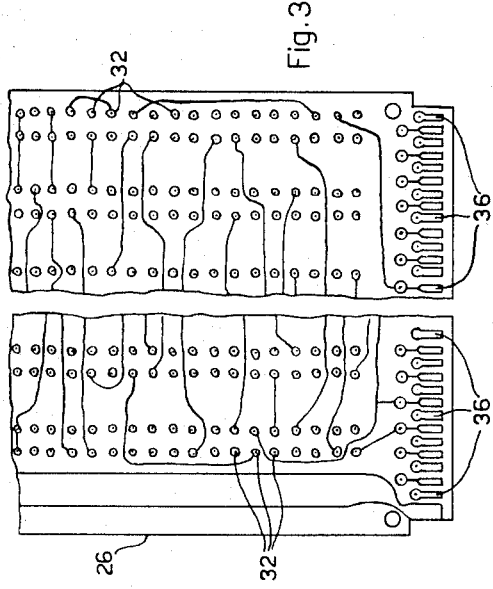
FIG. 3 is a view of the other face of the board to be tested.

Referring now to the drawings, and more particularly to FIG. 1, the apparatus according to the invention for automatically testing electronic circuits mounted on pre-printed supporting and connecting boards includes a machine 21 having a supporting cabinet 22 and a vertical frame 23. A plate 24 is pivoted on the frame 23 and is mounted on a bellow-type air drive 25 known per se.

Figure 2:
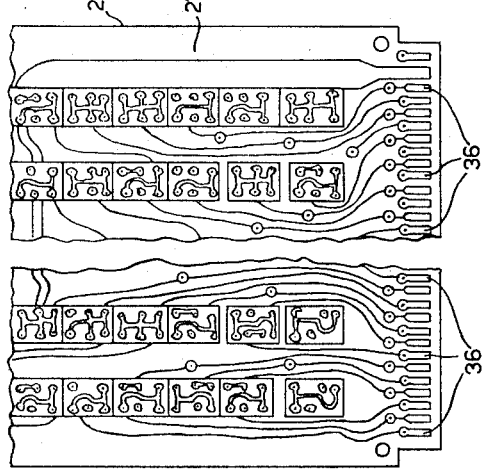
FIG. 2 is a partial view of a board to be tested, more precisely a partial view of the face on which the circuits are mounted.

The plate 24 serves as a support for a board 26 bearing micro-modules or micro-logic circuits which is placed over the plate 24 with the face 27 (FIG. 2) bearing the micro-modules facing downward. The columns of micro-modules are inserted between bars 28 fixed to the plate 24 and suitably spaced to avoid crushing and damaging the micro-modules themselves. The board 26 is fixed to the plate 24 by means of the spring catches 29.

The frame 23 supports a second plate 30 to which there are fixed contacts 31 which are distributed on the plate 30 so as to be located in correspondence with the input and output terminals 32 of the micro-modules. The boards 26 are generally of a number of standard types, that is in which the micro-modules are distributed topologically in accordance with certain fixed rules. On these boards 26 there are identified the micro-modules or the groups of micro-modules which are functionally independent.

Over the plate 30 there is fixed a mask 33 (FIG. 1) of insulating material in which there are formed apertures 34 exposing certain ones of the contacts 31 corresponding to the input and output terminals of the functionally independent micro-modules of a specific circuit board. Therefore, for each type of board 26 to be tested, there is a corresponding mask 33. The mask 33 moreover has the function of preventing the contacts 31 from touching dangerous points of the circuit, where, for example, the potential which exists between the contact and the terminal itself could cause damage to the circuit or in any case impair the operation thereof.

To the plate 30 there is also fixed a series of fixed contacts 35 disposed in correspondence with the external terminals 36 of the board 26.

Figure 4:
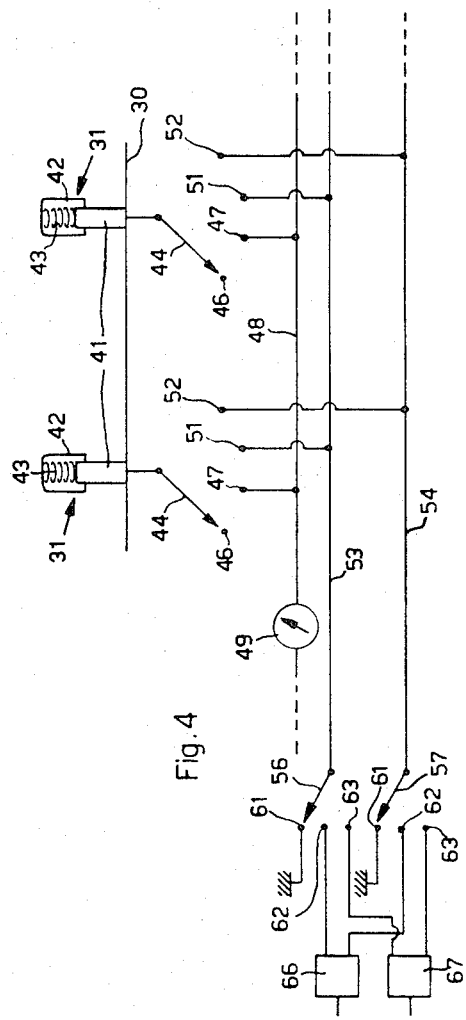
FIG. 4 is a diagram illustrating the circuits relating to the contacts of the apparatus.

Each of the contacts 31 and 35 is constituted by a cylindrical member 41 (FIG. 4) fixed to the plate 30 and a socket or sleeve 42 resiliently biased outwardly by a spring 43. Each of these contacts is connected to a terminal of a four-position switch 44, which may be of electromechanical or electronic type. A first position 46 of this switch 44 is an open circuit. A second position 47 connects the respective contact 31 to a universal bus 48, which extends to a measuring instrument 49 capable of effecting measurements of electrical quantities of various types. Another two positions 51 and 52 connect the contact 31 to two universal bus conductors 53 and 54.

The bus conductors 53 and 54 are also respectively connected to one terminal of three-position switches 56 and 57. In a first position 61, these switches connect the respective conductors to ground, or in any case to a reference voltage.

In the other two positions 62 and 63, these switches connect the conductors to two voltage generators 66 and 67, which are able to supply two predetermined voltage values and have a predetermined impedance at their terminals.

Referring again to FIG. 1, the machine 21 is controlled manually through two push buttons 71 which operate the pneumatic device 25 for turning or swinging the plate 24. In addition, on the machine 21 there is mounted a series of signal lamps 72 which indicate correct operation of the machine itself.

The apparatus further includes a computer 81 of a type known per se which is provided with an internal operative memory capable of storing the general test program, that is the instructions for the succession of operative stages of the testing process, and a set of data relating to the testing of one type of said boards. More particularly, the computer is conditioned by these data to operate control means (not shown) of known construction for positioning the switches 44, 56 and 57 in the successive stages. Further, additional data from the internal memory conditions the computer to command a comparison between the datum taken from the measuring instrument 49 and the sample datum contained in the memory itself. This exchange of information between the computer 81 and the machine 21 takes place through a cable 83 under the control of instructions stored in the memory in the known manner.

The computer 81 is connected to an external auxiliary memory, for example a disc memory 86, in which there are stored sets of data each relating to each different type of board to be tested.

The selection of the set of data which is concerned in the case of the board currently under test is effected through the keyboard 91 of a peripheral machine 92 which is connected to the computer through a cable 93. The machine 92 is also able to print the results of the testing process by means of a printer 94 and under the control of the computer 81. More precisely, the positions on the board of elements which may be damaged are printed. The repair of a board therefore becomes extremely simple.

The testing is effected in the following manner.

According to the type of board to be tested, the relevant set of test data is selected through the keyboard 91 and is thus introduced into the operative memory of the computer 81.

By pressing the two push buttons 71, the plate 24 is swung so as to bring the board 26 against the contacts 31 of the plate 30, which, being spring-loaded, adapt themselves to the various heights of the corresponding input and output terminals of the micro-modules.

The external terminals 36 of the board 26 also bear against the corresponding contacts 35. The computer 81 sends to these contacts 35 suitable signals for simulating the actual working conditions of the board 26 to be tested.

The testing process begins with checking that all the contacts 31 are touching the corresponding terminals. To this end a measurement of impedance is made; more precisely, a check is made as to whether the impedance at the ends of each of the circuits of the contacts is smaller than a predetermined impedance. If there are contacts which are not touching, the computer causes a jump in the program in a known manner. The instructions actuated in consequence of the jump operation cause the computer to interrupt the test. In addition, these instructions cause the computer to condition the printer 94 to print the coordinates of the contacts which are not touching in a known manner.

This preliminary check having been made, the testing continues with a second test intended to ascertain that there are no short-circuits between the connections of the various elementary circuits. For example, in the case of an elementary NOR circuit, a check is made as to whether each of its inputs is not short-circuited either with ground or with the voltage generator. This test is effected at a voltage which is supplied, for example, by one of the generators 66 and 67 selected by computer 81, this voltage being reduced with respect to the normal feed voltage of the board in order to avoid damage to the components if there were actually short-circuits present. To this end, the computer 81 now selects the switches 56 and 57 and connects the buses 53 and 54 with the selected generators 66 and 67. Furthermore the computer 81 selects the switch 44 corresponding to the circuit terminals to be tested and to be connected with the same buses 53 and 54. In this manner, each of the circuits of the board 26 are isolated functionally in succession in order to test them individually, whereby, the possible faults are also isolated. If faults are found, the test is again interrupted and the coordinates of the short-circuit points are printed, as is described hereinabove.

The third check which is made is that of continuity of the tracks of the printed circuits. A reduced voltage supplied by generators 66 is also used in this case. The computer 81 causes the generators 66 and 67 to now be selectively connected to the buses 53 and 54 according to the program of the third check. The computer 81 also causes the switch 44 corresponding to inputs of the circuit to be tested to be connected with the buses 53 and 54 and the switch 44 corresponding to the output of the same circuit to be connected through the bus 48 to the instrument 49. The test is effected by sending this reduced voltage at one end of a track and grounding the other end through a resistor of predetermined value. The voltage at the ends of this resistor is then measured by instrument 49. If the circuit is in order, this voltage should be substantially identical to the supply voltage.

These tests, which may be regarded as checks on the external circuits, having been completed, the functional tests then proceed, and these are carried out with a supply voltage equal to the normal voltage, as described hereinabove. The functional tests are of different types, depending on the types of circuits which are to be tested. The aim of these tests is in any case to make sure of the correct logical functioning of each micro-module and, to this end, the tests are carried out by successively isolating each functionally independent micro-module or group of micro-modules. The appropriate signals are sent to the inputs of these elements and a check is made that the corresponding outputs are accurate. In the event of a fault, the coordinates of the damaged element and also the kind of fault found are printed.

It is therefore clear that whatever the kind of damage or trouble, this is detected or identified by one of the tests described, and it is moreover obvious that the repair of a board now requires very limited time and does not offer any difficulty, so that it can be effected even by personnel having normal qualifications. Moreover, changing from the testing of a certain type of machine to the testing of another type of machine also becomes extremely easy.

I claim:

1. Apparatus for automatically testing electronic circuit boards constituted by a plurality of discrete components arranged thereon in a predetermined configuration and having a plurality of connecting positions arranged in a predetermined configuration for making electrical connections to said components, said apparatus being capable of detecting and identifying at least a particular one of said components which is defective, said apparatus comprising:

plate means having a plurality of resiliently biased contacts disposed in the same configuration as the connecting positions of the board to be tested, removable insulating mask means constructed to be disposed over said plate for selectively exposing certain of said contacts, the exposed contacts corresponding in configuration to the connecting positions on the board to be tested, a different mask being provided for each different type of board to be tested, manually controlled means for moving said contacts and said mask against the said connecting positions corresponding thereto, a first source of signal voltage for producing an output of a value sufficient to cause said components to perform their respective circuit functions, a second source of signal voltage for producing an output of a value relatively less than the value of first said output, means for measuring electrical quantities and sensing the electrical conditions at said contacts, common bus conductor means, a plurality of first multi-positioned switches, each said first switch having a movable common terminal connected to a respective one of said contacts and having a plurality of selectable terminals, one of said selectable terminals of each of said switches being connected to said measuring means, at least another of said selectable terminals being connected to said common bus conductor means, at least a second multi-positioned switch having a common terminal connected to said common bus and having one selectable terminal connected to said first source and at least one other selectable terminal connected to said second source, and means for selectively coupling said second switch to said first and second sources in a manner as to actuate each said component individually and in succession, said coupling means acting to connect said second source to said common bus followed by said first source and said coupling means including means for selectively connecting said measuring means to individual ones of said contacts over selected ones of said first switch means and others of said contacts to said common bus over others of said first switch means.

2. An apparatus as recited in claim 1, wherein one of the selectable terminals of each of said switches is connected to an open circuit and at least another of said selectable terminals is connected to a common bus conductor.

* * * * *